(12) United States Patent
Pauws et al.

(10) Patent No.: US 7,756,847 B2
(45) Date of Patent: Jul. 13, 2010

(54) METHOD AND ARRANGEMENT FOR SEARCHING FOR STRINGS

(75) Inventors: Steffen Clarence Pauws, Eindhoven (NL); Sebastian Egner, Eindhoven (NL); Johannes Henricus Maria Korst, Eindhoven (NL); Marcel Van Vuuren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 103 days.

(21) Appl. No.: 10/547,328

(22) PCT Filed: Feb. 25, 2004

(86) PCT No.: PCT/IB2004/050148

§ 371 (c)(1),
(2), (4) Date: Aug. 30, 2005

(87) PCT Pub. No.: WO2004/079631

PCT Pub. Date: Sep. 16, 2004

(65) Prior Publication Data

US 2006/0179052 A1 Aug. 10, 2006

(30) Foreign Application Priority Data

Mar. 3, 2003 (EP) .................................. 03100517

(51) Int. Cl.
*G06F 17/30* (2006.01)

(52) U.S. Cl. ...................................... 707/705; 707/713
(58) Field of Classification Search .................. 707/1–5
See application file for complete search history.

(56) References Cited

U.S. PATENT DOCUMENTS 5,418,951 A * 5/1995 Damashek ...................... 707/5

(Continued)

OTHER PUBLICATIONS

Burkhardt et al, Q-Gram Based Database Searching Using a Suffix Array (QUASAR), ACM 1999, pp. 77-83.*

(Continued)

*Primary Examiner*—Don Wong
*Assistant Examiner*—Sheree N Brown

(57) ABSTRACT

This invention relates to methods of searching for a final number of result strings (30-33) having a partial or an exact match with a query string (34) in a database (80) comprised of many long strings or a long string, said method includes the steps of partitioning the query string in a first number of input query strings (35, 36, 37); determining a second number of neighboring strings (38-41, 42-45, 44-49, respectively) for each string in said first number of input query strings, wherein each string in said second number of neighboring strings has a predetermined first number of errors; searching the database for a third number of exact matches (50-61, 70-74) for each string in said second number of neighboring strings based on a search method; concatenating said searched exact matched strings from the database into a fourth number of intermediate strings (29, 30, 32, 33, 34) wherein said searched exact matched strings (50-61, 70-74) comprised in each of said intermediate strings are in succession to one another in said database; and determining the final number of result strings (30-33) based in said fourth number of intermediate strings, wherein each string in the final number of result strings has a maximum of predetermined second number of errors compared to said query string (34). This enables for a perfect match or a partial match containing only minor errors with respect to said query string, and for a fast search in larger databases with a relative low use of processing power.

15 Claims, 6 Drawing Sheets

U.S. PATENT DOCUMENTS

| | | | | |
|---|---|---|---|---|
| 5,553,272 | A * | 9/1996 | Ranganathan et al. | 716/11 |
| 5,761,538 | A * | 6/1998 | Hull | 712/300 |
| 5,778,361 | A * | 7/1998 | Nanjo et al. | 707/5 |
| 5,852,821 | A * | 12/1998 | Chen et al. | 707/2 |
| 5,963,957 | A | 10/1999 | Hoffberg | |
| 6,026,398 | A * | 2/2000 | Brown et al. | 707/5 |
| 6,401,084 | B1 * | 6/2002 | Ortega et al. | 707/2 |
| 6,473,754 | B1 * | 10/2002 | Matsubayashi et al. | 707/5 |
| 6,546,383 | B1 * | 4/2003 | Ogawa | 707/2 |
| 6,556,984 | B1 * | 4/2003 | Zien | 707/2 |
| 6,654,734 | B1 * | 11/2003 | Mani et al. | 707/2 |
| 6,681,222 | B2 * | 1/2004 | Kabra et al. | 707/5 |
| 6,775,666 | B1 * | 8/2004 | Stumpf et al. | 707/5 |
| 7,010,522 | B1 * | 3/2006 | Jagadish et al. | 707/3 |
| 7,283,999 | B1 * | 10/2007 | Ramesh et al. | 707/6 |
| 7,299,126 | B2 * | 11/2007 | Gedik et al. | 701/207 |
| 7,313,554 | B2 * | 12/2007 | Chen et al. | 707/3 |
| 7,346,625 | B2 * | 3/2008 | Chen et al. | 707/102 |
| 2002/0072863 | A1 * | 6/2002 | Tomikawa et al. | 702/22 |
| 2003/0120647 | A1 * | 6/2003 | Aiken et al. | 707/3 |
| 2003/0200199 | A1 * | 10/2003 | Snyder | 707/2 |
| 2004/0141354 | A1 * | 7/2004 | Carnahan | 365/145 |

OTHER PUBLICATIONS

Jagadish et al, Using Q-Grams in DBMS for Approximate String Processing, Internet www.pages.stern.nyu.edu/~panos/publications/deb-dec2001.pdf,pp. 1-7.*

Du, D.W. and Chang, S.C. (1994), "An approach to designing very fast approximate string matching algorithms", IEEE Transactions on Knowledge and Data Engineering, 6, 4. 620-633.

Myers E. W. : A Sublinear Algorithm for Approximate Keyword Searching, vol. 12, No. 4-5, Oct. 1995, pp. 345-374, XP008033755.

Luis Gravano, et al: Using Q-Grams in a DBMS for Approximate String Processing, IEEE vol. 24, No. 4, 2001, pp. 28-34, XP002291636.

* cited by examiner

FIG. 2

METHOD AND ARRANGEMENT FOR SEARCHING FOR STRINGS

This invention relates to a method of searching for a final number of result strings having a partial or an exact mach with a query string in a database comprised of many long strings or of a long string.

The present invention also relates to a search engine.

The present invention also relates to a tool.

The present invention also relates to a computer system for performing the method.

The present invention further relates to a computer program product for performing the method.

Additionally, the present invention further relates to an arrangement.

U.S. Pat. No. 5,963,957 discloses an information processing system having a music database. Said music database stores homophonic reference sequences of music notes. The reference sequences are all normalized to the same scale degree in order to be stored lexicographically. A so called N-ary is applied to find a match between a string of input music notes and a particular reference sequence. Hereby said information processing system provides bibliographic information associated with the matching reference sequence.

In Du, D. W. and Chang, S. C. (1994), an approach to designing very fast approximate string matching algorithms, IEEE Transactions on Knowledge and Data Engineering, 6, 4, 620-633, another kind of string matching is further disclosed.

In the art, retrieval methods use algorithms for exact matching. However the known retrieval methods typically attempt an exact match, i.e. the search or the match is performed in order to find a perfect match.

However, it is a problem in many practical applications that only a perfect match is searched for. As a result, it is an additional problem that no matching result(s) is/are provided even though this/these may be useful even if it/they only contained minor errors.

It is a further problem that search of large database takes a long time and correspondingly requires intensive usage of processing power.

In many practical applications it is sufficient to obtain a partial match (instead of the perfect match). This is the case since either a query string—as an input to the search attempt—or the result matching string, both may have less important errors but still it is better to obtain the partial match result than no result at all. Said errors, typically, are caused by improper data comprised either in the query string or in the database searched in.

The above and other problems are solved by said method, when the method comprises the steps of:

partitioning the query string in a first number of input query strings;

In other words, in this step, the query string is cut into said first number of small pieces of substrings, i.e. into said input query strings.

determining a second number of neighboring strings for each string in said first number of input query strings, wherein each string in said second number of neighboring strings has a predetermined first number of errors;

In other words, in this step, the second number of neighboring strings depends of the length of the query string, the size of different discrete symbols in the string alphabet applied and the numbers of errors allowed in the neighboring strings.

In general, for each string in said first number of input query strings said second number of neighboring strings are determined. Each of these, individually has a predetermined first number of errors, which is greater than or equal to zero.

searching the database for a third number of exact matches for each string in said second number of neighboring strings based on a search method;

Hereby, is the database searched for a number (third) of exact matches for each string in said second number of neighboring strings based on a given search method, the search method can be a q-gram index method, a suffix tree method or a hash method.

concatenating said searched exact matched strings from the database into a fourth number of intermediate strings wherein said searched exact matched strings comprised in each of said intermediate strings are in succession to one another in said database; and determining the final number of result strings based on said fourth number of intermediate strings, wherein each string in the final number of result strings has a maximum of a predetermined second number of errors compared to said query string.

For the last two steps, these are explained in FIG. 5, i.e. step 400 and 500.

As a result of the method, said final number of result strings, each is an exact or a partial match to said query string (mentioned in the opening paragraph).

It is hereby achieved to obtain a perfect match or a partial match containing only minor errors.

Further, the method can search large databases (for perfect or partial matches) fast with a relative low use of processing power.

Said arrangement, tool, search engine, computer system, respectively provides the same advantages and solves the same problem(s) for the same reasons as described previously in relation to the method.

The invention will be explained more fully below in connection with preferred embodiments and with reference to the drawings, in which:

FIG. 2 shows a way of partitioning the query string;

Throughout the drawings, the same reference numerals indicate similar or corresponding features, functions, strings, etc.

Figure 1:
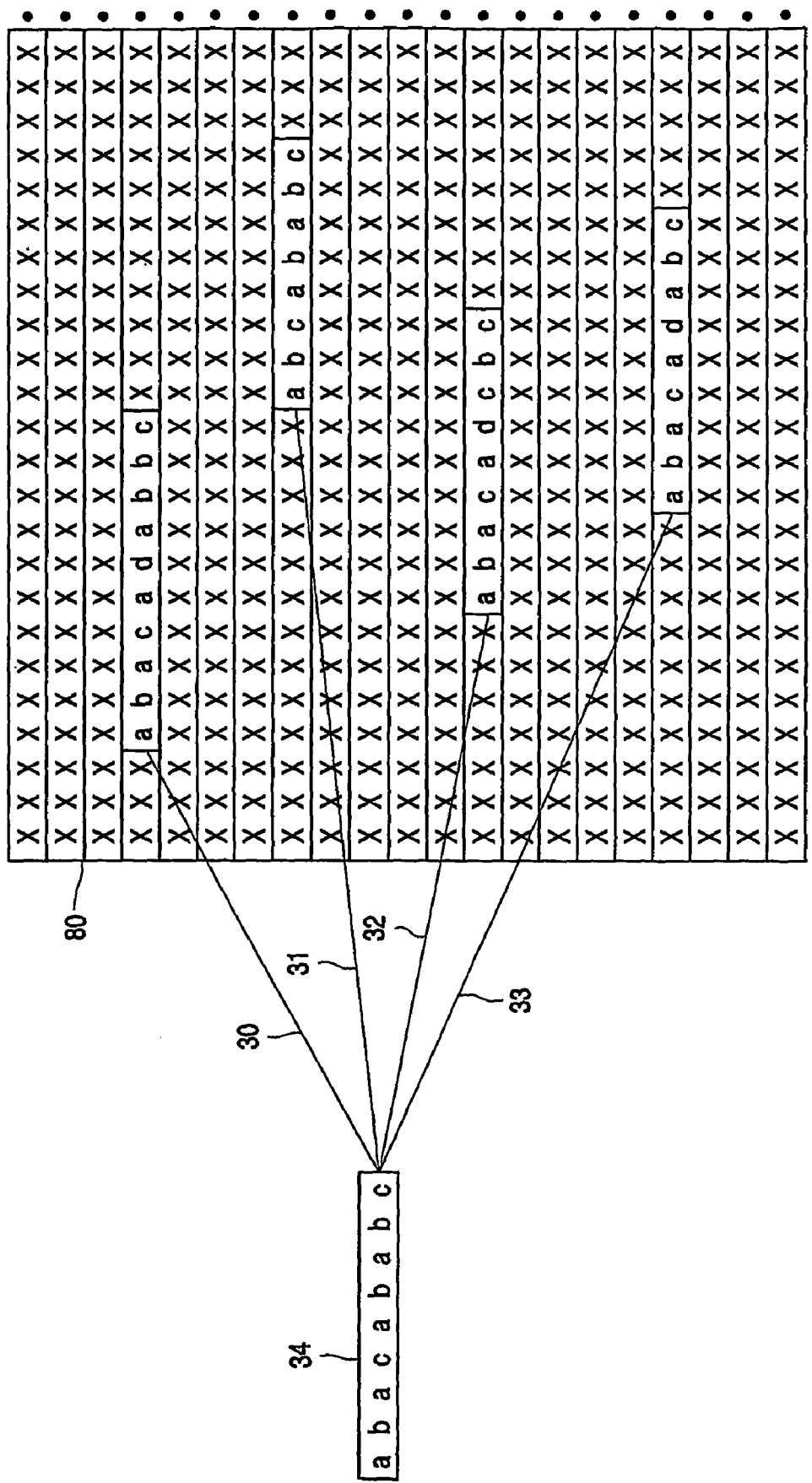
FIG. 1 shows a general discussion of the art.

FIG. 1 shows a general discussion of the art. The figure shows a query string 'abacababc' searched for in a string database, reference numeral 80. The database positions of the four approximate matches of the query string allowing at most one error (k=1) are indicated. The query string, reference numeral 34, 'abacababc' which is composed from a 3-letter alphabet {'a', 'b', 'c'}. If only one error (k=1) is allowed, an approximate match is found containing an added symbol (e.g., reference numeral 30: 'abacadabbc'), an approximate match containing a deleted symbol (e.g., reference numeral 31: 'abcababc'), an approximate match containing a substituted symbol (e.g., reference numeral 32: 'abacadcbc') and an exact match (i.e., reference numeral 33: 'abacadabc'). It is generally acknowledged in the art to search for a string whereby the entire query string is searched for at once.

Figure 2:
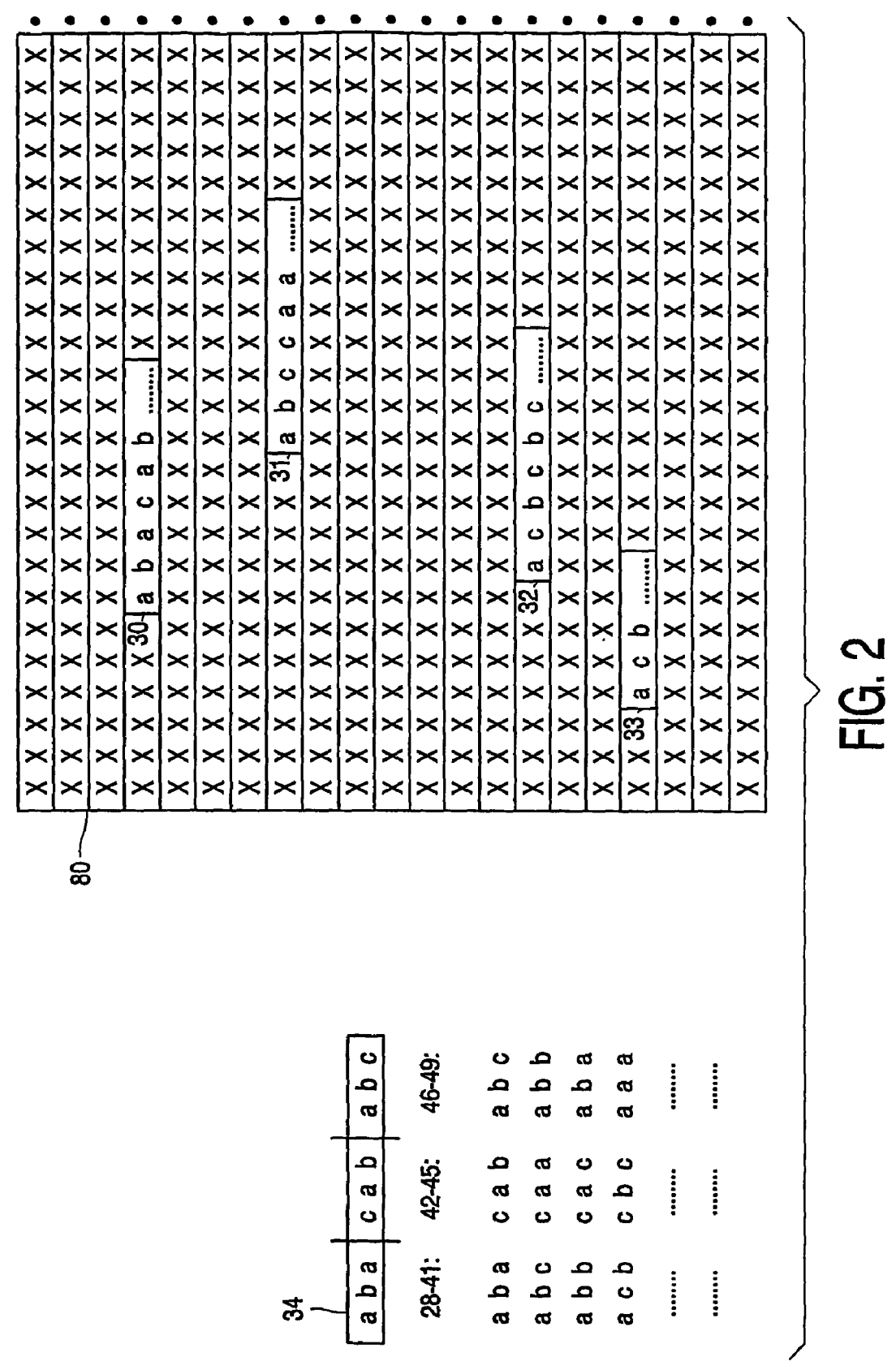

FIG. 2 shows a way of partitioning the query string. Efficient retrieval methods, known from the literature, capitalize on the use of fast algorithms for exact matching, that is, searching without allowing any error (or, k=0). This would only return the position for (exact) match, i.e. reference numeral 33 from FIG. 1. Specialized index structures such as suffix trees or q-grams need to be build off-line (as a pre-processor) from the string database, reference numeral 80 to enable the implementation of fast exact matching algorithms. Essentially, these structures keep hold of all positions of each small sub-string that occur in the database. Effectively, this means that the retrieval process can immediately jump to the relevant spots in the database while discarding the irrelevant parts. The q-gram index method is used, since it is more space-efficient (i.e., uses less memory) than other methods and can be easily adapted to our purpose. The q-gram keeps all positions of all sub-strings of length q>0 occurring in the database. If, for instance, the database consists of the string 'ababbcabcabacab . . . ', the q-gram with q=4 collects the starting positions of all sub-strings of length 4 such as 'abab', 'baba', 'abab', 'babc' and 'abca'. These sub-strings are indexed by using a function, listed and sorted in an easily accessible data structure. Similar sub-strings, such as 'abab' in the example, end up at the same index (called a bucket). A q-gram allows us to obtain the database positions of all exact matches of a query of length $m \leq q$ by computing the index function and retrieve the members of a bucket. Queries that are longer than q need an additional check because only the prefixes of length q of the query can be in a bucket. The standard way to work with q-grams is described by Myers, 1994.

As alternatives to said q-gram method, a suffix tree method or a hash method may be applied.

If exact matching methods are used in approximate matching, a workaround has to be found for the errors allowed. For instance, according to the invention a set of strings can be generated that differ on a limited number of locations in the original query (string). These strings are called neighbors of the query. Neighbors thus represent the errors in a query. Formally, a k-neighborhood of a string S is defined as the set of strings with at most k errors with respect to S. For instance, if the query 'abba' is constructed from the two-letter alphabet {'a', 'b'}, the complete set of neighbors with at most one error (i.e., error level $k \leq 1$) consists of the original 'abba', all strings with a deletion 'abb', 'aba' and 'bba', all strings with a addition 'aabba', 'babba', 'abbba', 'ababa', 'abbaa' and 'abbab' and all strings with a substitution 'bbba', 'aaba', 'abaa' and 'abbb'.

Neighbors of a given string can be efficiently generated (Myers, 1994). If the neighbors are located in the database using the q-gram method, these exact matches correspond to approximate matches of the original query.

However, the number of neighbors to be investigated is exponential when longer queries are investigated, a larger alphabet and a higher error level. To resolve this issue and gain retrieval speed, the query is first partitioned in smaller sub-strings and for each sub-string its set of neighbors is generated. Then all these neighbors are searched exactly using q-grams or the other search methods mentioned. Their exact matches in the database correspond now to partial approximate matches of the original query.

Let the query be 'abacababc' composed from the three-letter alphabet {'a', 'b', 'c'} and allow an error level of 3 (k=3). Note that errors in the query can occur at any place. For instance, the errors can be all at the start (e.g., 'ccccababc' can then be the string you are actually looking for), all in the middle (e.g. 'ababbcabc'), all at the end (e.g., 'abacabbca')

or uniformly distributed in the query (e.g., 'abccacabb').

If the query is partitioned into three parts (p=3, which results in the substrings 'aba', 'cab' and 'abc' for our example query 'abacababc'), a set of neighbors is generated for each part and each neighbor is searched individually in the database, context is lost about how the original query looks like. To understand this, note that the neighbors can occur anywhere in the database. Neighbors do not necessarily appear close together or in a sequence, which is required to form an approximate match of the original query. In other words, when an exact match is found for a neighbor for our example query 'abacababc', it cannot be known whether it reflect the first, second or third part of the query and what kind of neighbors are found for the other parts. Necessary measures have to be taken to reveal this information. Former methods described in literature stop right here, that is, they consider each exact match of a neighbor as a useful candidate for resolving the query. In contrast, the invention of cross-cutting does an additional filter step by re-establishing the (error) context while searching the neighbors. The neighbors that can be discarded are those that do not appear in a sequence with other neighbors in the database, and those that form a sequence with other neighbors in the database that cannot be an approximate match of the original query.

These observations are condensed in a central 'cross-cutting' lemma for the current invention that provides a guarantee about the successful retrieval of relevant parts if we partition a query string in p parts and search for the parts separately each with at most $k_i$ errors.

Cross-cutting lemma: Let A and B be two strings such that the number of errors between them is smaller than or equal to k in edit-distance sense, or formally $\partial(A,B) \leq k$ Let $A = A_1 A_2 \ldots A_p$ be the partitioning A in p parts, for strings $A_i$ and for any p>1. Let $K=(k_1, k_2, \ldots, k_p)$ be any sequence of nonnegative numbers such that $C = \sum_{i=1}^{P} k_i + p - k \geq 1$. Then there exists a partitioning $B = B_1 B_2 \ldots B_p$ and a subset of the parts indexed by $J=(j_1, j_2, \ldots, j_l)$ such that $\sum_{i=1}^{l} k_{j_i} + 1 - \partial(A_{j_i}, B_{j_i})) \geq C$.

Proof: It is evident that B can be partitioned in p parts such that $\sum_{i=1}^{P} \partial(A_i, B_i) = \partial(A,B)$: look to it that the errors are located at corresponding parts and do not introduce additional errors. We choose such a partitioning of B and all parts i in the subset J for which $k_i + 1 \geq \partial(A_i, B_i)$. Now we can derive the following which proves our case:

$$C = \sum_{i=1}^{p} k_i + p - k \leq \sum_{i=1}^{p} k_i + 1 - \partial(A_i, B_i) \leq \sum_{i=1}^{l} k_{j_i} + 1 - \partial(A_{j_i}, B_{j_i})$$

The lemma is used as a filtration condition in the invention with A being the query string and B the database string. The lemma says that the number of errors e, that a sequence of neighbors in the database represents, has to fulfil a particular criterion. For that criterion, $k_i$ is applied as the pre-defined number of errors that are allowed in each sub-string i of the query. Then, the error summation $$\sum_{i=1}^{p} (k_i + 1) - e$$

should be at least a constant $$C = \sum_{i=1}^{p} k_i + p - k$$

to be still part of an approximate match of the query. In these formulae, p is the number of sub-strings in which the query string is partitioned, $k_i$ is the number of errors allowed in each sub-string i, and k is the maximum total number of errors (error level).

Calculating the error summation $$\sum_{i=1}^{p} (k_i + 1) - e$$

and comparing it to C is the foundation of the cross-cutting algorithm. Shortly, each time a new match of a neighbor has been found at a particular position in the database, it is checked whether or not there are matches of other neighbors preceding that database position. Specialized data structure keeps track of all the positions of the neighbors in the database in an efficient way. Then, it is verified whether or not the concatenation of these consecutive matches (as they appear in the database) can eventually result in an approximate match of the complete query. If the error summation is equal or larger than the threshold C, than these neighbors are still relevant candidates for being part of an approximate match of the query. If the error summation is lower than this threshold C, all involved neighbors can be discarded.

As shown in FIG. 2, the query 'abacababc', reference numeral 34, is partitioned in three sub-strings (p=3). Recall that only 3 errors are allowed (k=3). Define $$k_i = \left\lfloor \frac{k}{p} \right\rfloor = 1 \text{ and } C = \sum_{i=1}^{p} k_i + p - k = 3.$$

For each sub-string, a set of neighbors i.e. reference numeral 38-41, 42-45 and 46-49, respectively is generated which are sought exactly in the database. In the process of neighbor search, the positions of all neighbors found so far are kept and it is decided whether or not the concatenation of consecutive neighbors can be part of an approximate match of the query. The two matches for the neighbors 'aba' and 'cab' (see reference numeral 30 in FIG. 2) represent an error-free match of the first two sub-strings of the query string (i.e., e=0 and $$\sum_{i=1}^{2} (k_i + 1) - e = 4 \geq C = 3).$$

Already it is known that a valid approximate match of the query have been found; in the worst case a neighbor representing 3 errors can succeed these two matches for which our filtration condition still holds. The two matches for the neighbors 'abc' and 'caa' (see 31 in FIG. 2) represent 2 errors (i.e., e=2 and $$\sum_{i=1}^{2} (k_i + 1) - e = 2).$$

This sequence can only be succeeded by a neighbor representing at most 1 error to be still a valid approximate match of the query. The matches for the neighbors 'acb' and 'cbc' (see reference numeral 32 in FIG. 2) represent already 4 errors (i.e., e=4 and)

$$\sum_{i=1}^{2} (k_i + 1) - e = 0.$$

It is already known that this sequence cannot be part of an approximate match of the query. Even if it is succeeded by an error-free neighbor, the filtration condition does not hold.

For a more detailed and general discussion of said Q-grams and said Neighboring generation, respectively; the followings sections should enable the person skilled in the art to implement the invention:

Q-Grams or the Q-Gram Index Method:

With q-grams it is possible to find all occurrences of a string not bigger than q very fast. Those q-grams are constructed in the following way.

Consider a bisection $\phi$ of the symbols in $\Sigma$ to the integers 0 to $\sigma-1$. Function $\phi$ is naturally extended to strings with the recursive definition $\phi(Pa)=\sigma\phi(P)+\phi(a)$ where P is a string over $\Sigma$ and a is a symbol in $\Sigma$. For $b \in [0,\sigma^q-1]$, let Bucket(b)= $\{i:\phi(a_i a_{i+1} \ldots a_{i+q-1})=b\}$. That is, Bucket(b) gives the indices of the leftmost character of each occurrence in A of the unique q-symbol string whose $\phi$-code is b.

The index is produced in the following way. First $\phi_i=\phi(a_i a_{i+1} \ldots a_{i+m-1})$ is computed for every index i. This is done in an O(n) sweep of A using the observation that $\phi_i = a_i \sigma^{m-1} + \lfloor \phi_{i+1}/\phi \rfloor$. With an O(n log(n))-quick-sort the list can now be produced Indices=<$i_1, i_2, \ldots, i_n$> such that $\phi_{i_j} \leq \phi_{i_{j+1}}$. Finally, the array Header[b]=min$\{j:\phi_{Indices[j]}=b\}$ is produced in an O(n) sweep of Indices. The arrays Indices and Header provide a realization of the Bucket sets. Namely, Bucket[b]={Indices [j]:j ∈[Header[b], Header[b+1]−1]}.

If a query P is of length m≦q then all indices of the occurrences of P are exactly the content of Bucket(b) for b∈[$\phi$(P)$\sigma^{q-m}$, ($\phi$(P)+1)$\sigma^{q-m}$−1].

If a query P is larger than q it is known that the occurrences of P must be a subset of those in Bucket($\phi(P_q)$) where $P_q$ denotes the string consisting of the first q symbols of P.

Neighbor Generation:

A (complete) k-neighborhood of a string P is defined as the set of all strings with a (edit-)distance less than or equal to k from P, i.e. $N_k(P)=\{Q:\partial(Q,P)\leq k\}$.

A condensed c-neighborhood of a string P is defined as the set of all strings in the complete k-neighborhood of P that do not have a prefix in that neighborhood, i.e., $C_k(P)=\{Q:Q\in N_k(P)$ and no prefix of Q is in $N_k(P)\}$.

Myers' algorithm computes a condensed k-neighborhood of a string efficiently by generating words from an alphabet and computing the corresponding rows of the dynamic programming matrix of the currently generated word and P. If a word whose last entry of the current row equals k, then a word in the condensed k-neighborhood has been reached. If all entries are larger than k, the algorithm can backtrack. The use of failure links prevents the algorithm from missing words that are in the k-neighborhood but are not in the condensed one.

As the present invention needs the complete k-neighborhood of a string to find all exact matches of the partitions in the database, Myers's algorithm has been adapted.

Figure 3:
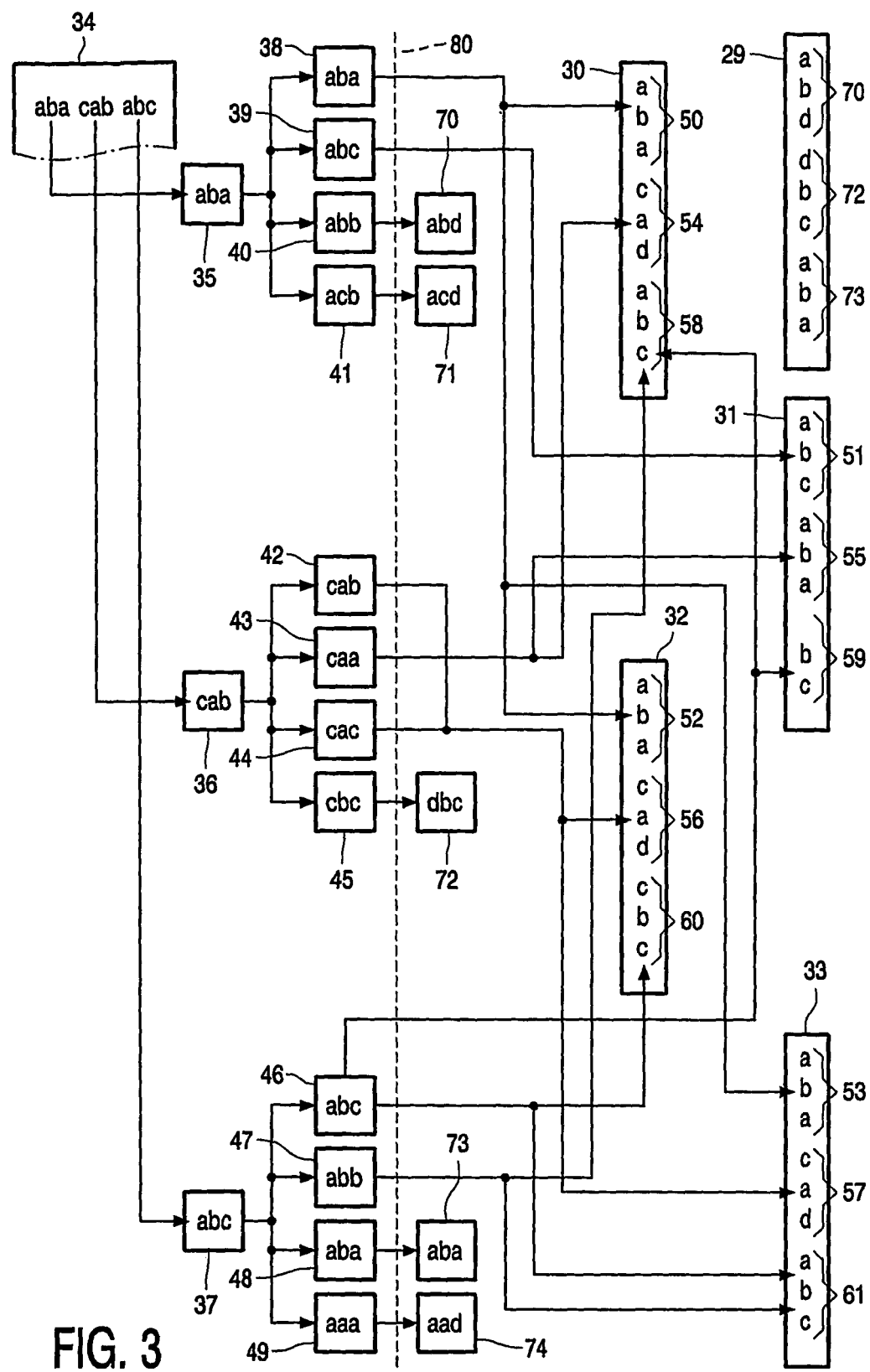
FIG. 3 shows a practical detailed example way of partitioning the query string and a subsequent search.

FIG. 3 shows a practical detailed example way of partitioning the query string and a subsequent search.

The query string, reference numeral 34, again is searched for in the database, reference numeral 80. According to the invention, said query string is partitioned into a number of input query strings, the number three is here chosen for conciseness, it may be any other number greater than one. In the example, said input query strings are represented by reference numeral 35, 36 and 37, respectively for the beginning part, the middle part and the "end part"-part.

By means of said number of input query strings, a number of neighboring strings—here four—is defined for each input query string. I.e. for the input query string of reference numeral 35, corresponding four neighboring strings, reference numeral 38, 39, 40 and 41 are determined.

Correspondingly, for the "mid part" input query string of reference numeral 36, corresponding four neighboring strings, reference numeral 42, 43, 44 and 45 are determined.

Correspondingly, for the "end part" input query string of reference numeral 37, corresponding four neighboring strings, reference numeral 46, 47, 48 and 49 are determined.

To the right of the dotted line, reference numeral 80, it is implied that in this section of the figure, the database—previously also indicated by the same reference numeral—is searched into, i.e. said neighboring strings, reference numeral 38-49, each is searched for in order to find exact (sub string) match(es).

These are indicated by following the arrows further to the right; as an example, reference numeral 38, a first part neighboring string gives the exact match of reference numeral 50; as another example, reference numeral 47, an end part neighboring string gives the match of reference numerals 58 and 61, and reference numeral 45, amid part neighboring string gives the "none-useful" result of reference numeral 72.

And in order to achieve final search result(s), more or less matching the query string, reference numeral 34; the arrows can be followed further to the right, i.e. reference numeral 30-33, respectively indicate each of the four final search results. As can be seen, each of said final search results is always comprised of one of the searched beginning substrings, reference numeral 50-53, one of the mid searched substrings, reference numeral 54-57 and one of the "end part" searched substrings, reference numeral 58-61. How these are put in succession and by which criterions will be explained by means of FIG. 5.

Figure 4:
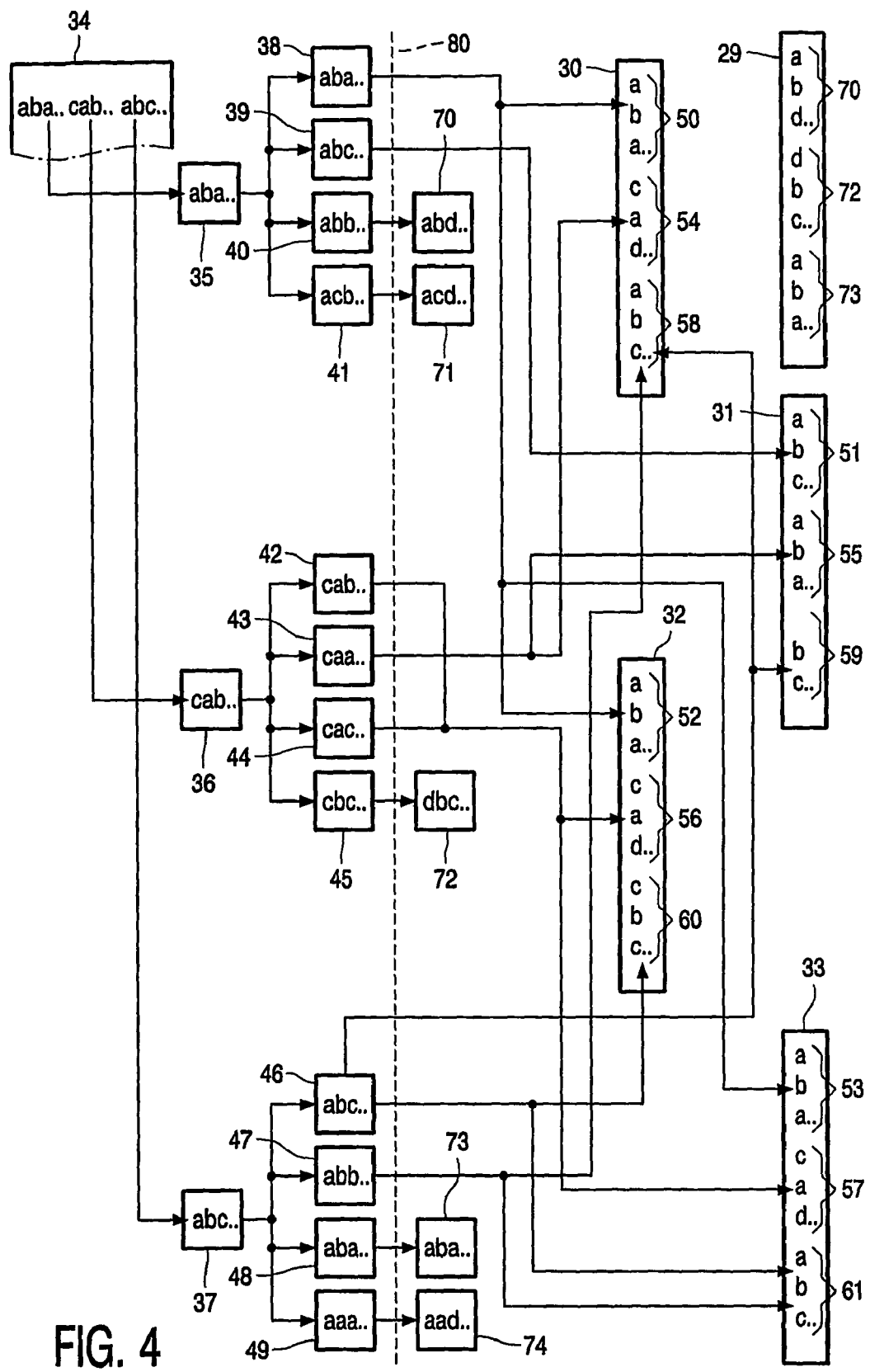
FIG. 4 shows a general example way of partitioning and searching the query string.

FIG. 4 shows a general example way of partitioning and searching the query string. FIG. 4 corresponds to FIG. 3, however, generally the " . . . "'s indicate that any string of any reference numeral may comprise fewer or more letters, i.e. the invention can be applied for very short strings and for very long sequence of letters as well.

The letters of the western alphabet—as shown—may alternatively be a sequence of elements in a pitch alphabet, a sequence of elements in a musical pitch interval alphabet, a sequence of elements in a musical time interval alphabet, a sequence of binary digits, words or bytes, a sequence of amino acids or a sequence of DNA/RNA. Correspondingly, the same applies for the database searched in, since it may also be understood as one long string or of many long strings.

Said sequence of elements in a musical pitch interval alphabet and sequence of elements in a musical time interval alphabet represents the essence of a musical score. In general for all strings (the query string, strings in the database, etc) this means that these can be made out of any alphabet of discrete symbols.

Figure 5:
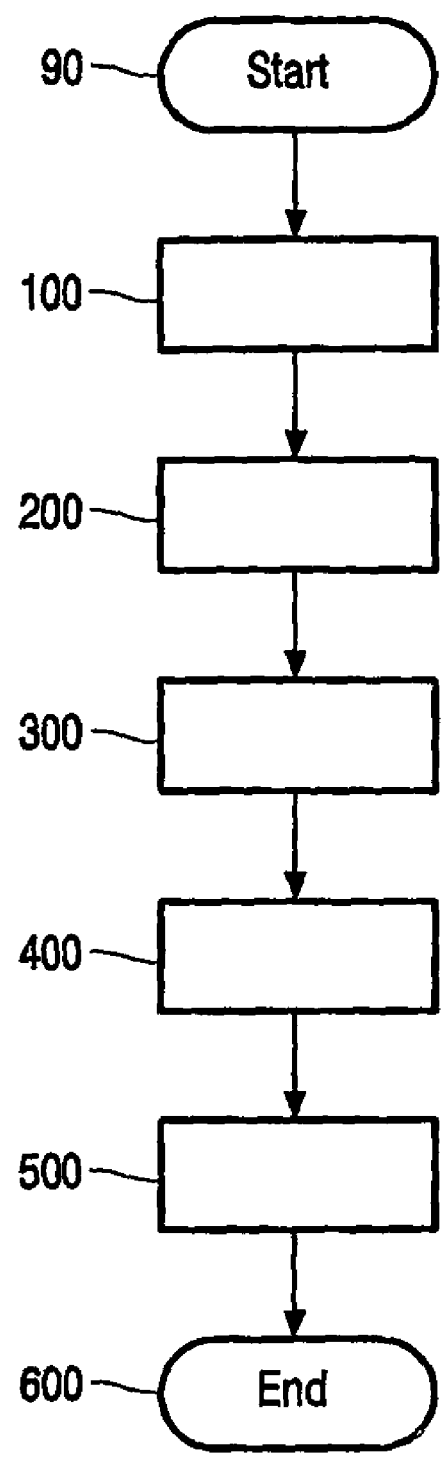
FIG. 5 shows a method of searching for a final number of result strings.

FIG. 5 shows a method of searching for a final number of result strings. The method searches for a final number of result strings as indicated by means of reference numerals 30 through 33 (in the foregoing figures). I.e. each of said final number of result strings will have a partial or an exact mach with the query string, reference numeral 34 in the database, if possible. The database, reference numeral 80, is comprised of a long string. Said method comprises the following steps:

In step 100, the query string is partitioned in a first number of input query strings. As indicated in the forgoing figures, said query string is partitioned in three input query strings, reference numerals 35, 36 and 37, i.e. the first number is here three. Said first number may be any number greater than or equal to one. The first number equaling exact three is only shown for illustrative purposes, i.e. any higher or lower number may be chosen as well.

In other words, in this step, the query string is cut into (said first number) small pieces of substrings, i.e. into said input query strings.

In the example, the query string, reference numeral 34, "aba . . . cab . . . abc" is cut into said set of first number of input query strings, in the example there are three in the set, i.e. input query string 1, reference numeral 35="aba . . . ", input query string 2, reference numeral 36="cab . . . " and input query string 3, reference numeral 37="abc . . . ".

In step 200, a second number of neighboring strings are determined. As also indicated in the forgoing figures, said second number of neighboring strings is four, i.e. reference numerals 38-41 for the first input query string reference numeral 35, reference numerals 42-45 for the second or mid input query string, reference numeral 36 and reference numerals 44-49 for the third or last input query string, reference numeral 37.

The second number equaling exact four is only shown for illustrative purposes, i.e. any higher or lower number than four may be chosen as well. In particular, the number of neighboring strings depends of the length of the query string, the size of different discrete symbols in the string alphabet applied and the numbers of errors allowed in the neighboring strings.

This gives, as the example a total of twelve neighboring strings, i.e. it equals said first number times said second number, i.e. 3×4=12, i.e. four for each (three) input query strings; or in general: for each string in said first number of input query strings said second number of neighboring strings are determined. As indicated in the forgoing figures, these are the reference numerals 38 through 49. Each of these, individually has a predetermined first number of errors, which is greater than or equal to zero.

Note that If the (first) number of errors exceeds the neighboring string length (i.e. all content of the string is then determined to be in error), consequently a subsequent search in the next step would be absolutely meaning less; therefore said first number of errors cannot exceed the string length.

As the example given, on basis of the input query string "aba . . . ", i.e. reference numeral 35, four neighboring strings are determined, i.e.:

reference numeral 38 "aba . . . " equaling itself, i.e. of course no errors.

reference numeral 39 "abc . . . " with one error, reference numeral 40 "abb . . . " with another error, and reference numeral 41 "acb . . . " with two errors.

In the example given, the predetermined first number of errors (which is greater than or equal to zero) is here 0, 1 or 2.

The first number of predetermined of errors, in the example equaling zero, one or two, is only shown for illustrative purposes, i.e. any higher number may be chosen as well.

In step 300, the database is searched for a third number of exact matches for each string in said second number of neighboring strings. Said search is based on a given search method.

Said third number of exact matches is illustrated by means of reference numerals 50-61 and 70-74. It is important to note that there may be one or more matches, e.g.:

firstly, reference numeral 38 "aba . . . "—as an example of a neighboring string—leads to the exact match of reference numeral 50 and 52, i.e. "aba . . . ";

secondly, reference numeral 39 "abc . . . "—as another example of a neighboring string—leads also to its exact match of reference numeral 51 "abc . . . ", thirdly, reference numeral 40 "abb" . . . " leads also to no match, i.e. reference numeral 70 "abd . . . ", and finally, reference numeral 41 "acb" . . . " also leads to no match, i.e. reference numeral 71 "abc . . . ".

The latter two is then unusable since only exact matches are considered.

Correspondingly, reference numerals 53-61 and 72-74 are search results from the neighboring strings indicated by means of reference numerals 42-49.

In all cases, the search results, reference numerals 50-61 and 70-74, with corresponding string content and corresponding positions in the database are kept for later use in the subsequent step.

Also, in all cases, the given search method may be the q-gram index method or any other appropriate method known to be useful in the art, e.g. a suffix tree method or a hash method.

In step 400, said searched exact matched strings from the database are concatenated into a fourth number of intermediate strings. Said searched exact matched strings (when comprised in each of said intermediate strings) are in succession to one another in said database.

Said fourth number of intermediate strings is indicated by means of reference numerals 29-33, the fourth number in the example given is five. Further, said searched exact matched strings—indicated by means of reference numerals 50-61 and 70-74—comprised in each of said intermediate strings are determined to be in succession to one another in said database: this will be explained in the following:

As can be seen from the examples—during concatenation—search result from the first input query string (being the beginning of the query string), reference numeral 35="aba . . . " having corresponding beginning neighboring strings, reference numeral 38-41 lead to corresponding beginning substrings, reference numeral 50-53.

Correspondingly, —during concatenation—search result from the second input query string (being the middle of the query string), reference numeral 36="cab . . . " having corresponding "middle" neighboring strings, reference numeral 42-45 lead to corresponding mid substrings, reference numeral 54-57.

Correspondingly, —during concatenation—search result from the third input query string (being the end part of the query string), reference numeral 37="abc . . . " having corresponding "end part" neighboring strings, reference numeral 46-49 lead to corresponding "end part" substrings, reference numeral 58-61.

In other words, the exact matched strings, reference numerals 50-61 and 70-74 as corresponding part of each of said intermediate strings are in fact in succession to one another in the database, i.e. one of the beginning substrings, reference numeral 50-53, one of the mid substrings, reference numeral 54-57 and one of the end part substrings, reference numeral 58-61 are concatenated into one of said fourth number of intermediate strings, i.e. one of reference numerals 29-33.

In step 500, the final number of result strings is determined. The determination is based on said fourth number of intermediate strings from the foregoing step, and here—in this step—each string in the final number of result strings is determined to have a maximum of a predetermined second number of errors compared to said query string of reference numeral 34.

In the examples given, the final number of result strings, reference numerals 30-33, is four, whereas said fourth number of intermediate strings was five. I.e. in the example, one, reference numeral 29 is discarded or left out since this in particular does not satisfy the criterion of having error(s) less than or equal to said second number of errors. This is seen when compared to said query string, of reference numeral 34.

In other words, reference numeral 29 is discarded for having too many errors (compared the initial query string of reference numeral 34), whereas reference numerals 30 through 33, individually had less errors and thus satisfied the criterion. That is, in the example reference numerals 30 through 33 comprise the final number of result strings.

As a result of the method, said final number of result strings, reference numerals 30-33, each is an exact or a partial match to said query string, reference numeral 34.

In the example given, four matches (exact or partial) was then the result when said query string was searched for.

This step—in connection with the foregoing step—is also called "Cross-cutting", i.e. the idea of considering only those exact matches of neighbors (when searched for) that, when concatenated, can contain an approximate match with the original query string of reference numeral 34.

In the spirit of the invention, any of said "first number", "second number of neighboring strings", "third number", "fourth number of intermediate strings" and "first and second number of errors, may be fine tuned individually or in relation to one another or in relation to the content of the query string and/or the database. Hereby either speed of search may be decreased and/or another matching (fewer/less) errors may be obtained.

Correspondingly, the given examples are illustrative and may also be expanded with another string length for the query string, neighboring strings, intermediate strings, another sequential content (of discrete symbols) of the strings, etc.

Figure 6:
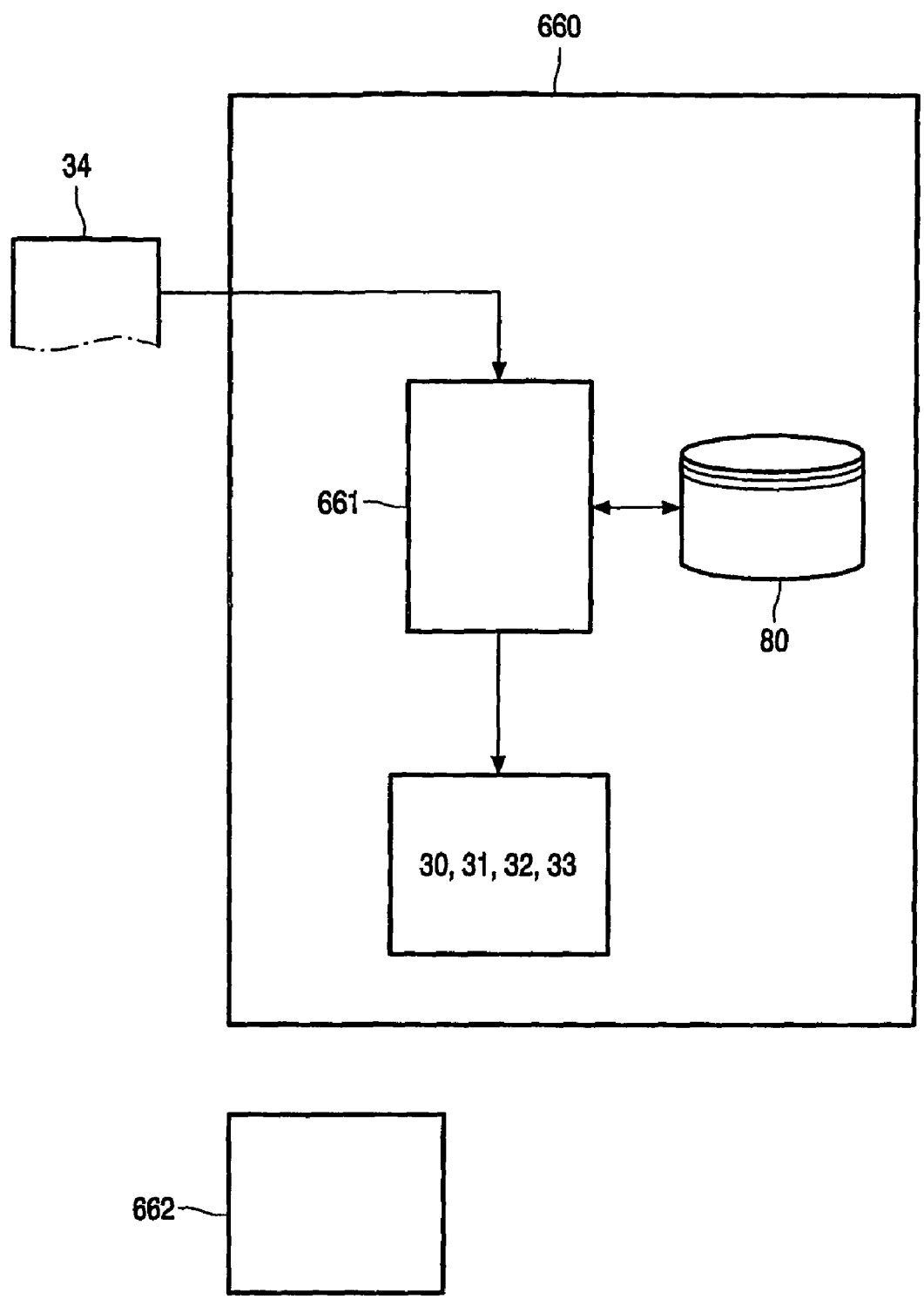
FIG. 6 shows an arrangement for searching.

FIG. 6 shows an arrangement for searching. Reference numeral 660 indicates said arrangement. The arrangement processes—according to the invention—the query string, reference numeral 34 as discussed in the foregoing figure. The arrangement processes said string as input and therefore comprises calculation means 661, e.g. a sufficient fast microprocessor. The microprocessor searches for matches in the database, reference numeral 80. As a result, if any, the final number of result strings, reference numeral 30, 31, 32 and 33 is found. The calculation means for carrying out the steps of the matching method can also be e.g. a part of a dedicated ASIC.

Reference numeral 662 denotes a computer program product. Said computer program product comprising program code means stored on a computer readable medium for performing said method when the computer program is run on a computer.

Generally, the present invention may be applied in various fields, such as melody retrieval for music systems ('query by humming'), finding keywords in a search engine or in a text file, finding DNA/RNA sequences in a molecular biology database, bits, bytes or word codes, error control, etc. For the melody retrieval application, it can be imagined that only a small fragment of a melody is remembered without recalling the complete melody or song. Once provided in the appropriate representation as a string of discrete symbols, this melody fragment can then be input to the search method to reveal the identity of the song or melody using said database. The search method thereby allows for errors in the input. The arrangement may be e.g. a jukebox-implemented as a stand alone audio apparatus or on a PC. It may also be a portable audio apparatus, which contains an interface enabling e.g. a jogger to quickly change his accompanying music by whistling the beginning or refrain. The arrangement may e.g. also be a service on an internet server for quickly selecting a particular MP3 from the web, or the arrangement may be a portable phone running the method, for retrieving e.g. a ring tone.

Similarly, keywords as a query (similar to previously mentioned query string) for a search engine—e.g. for searching a particular product on Internet or a word in a software dictionary—or a software search tool can contain typos. The search or retrieval process can account for these errors in the keywords. In all applications, the number of errors one allows may be pre-defined and fixed. The database can be best seen as one very long string (e.g., a long text, all melodies in the world put into sequence, etc). Also, the strings may be constructed from a finite collection (e.g. western or pitch alphabet, binary digits, bytes, words, amino acids, DNA/RNA, words, etc). For a text application, the 26 letters from the Western alphabet may be used. Correspondingly, melodies can be constructed from a 9-element pitch interval alphabet. Molecular biology applications use the twenty amino acids or the four nucleotides as the alphabet. Coding applications use the binary symbols, word, bits or bytes.

Under the essence of a musical score should be understood any information which is sufficient for retrieving a melody. E.g. tone intervals, or just time intervals in case a person is not very musical or wants to search a piece of music by e.g. tapping his foot, or both. These are converted into string characters by a predetermined mapping function.

A computer readable medium may be magnetic tape, optical disc, digital versatile disk (DVD), compact disc (CD record-able or CD write-able), mini-disc, hard disk, floppy disk, smart card, PCMCIA card, etc.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

REFERENCE

Myers, E. (1994). A sublinear algorithm for approximate keyword searching. Algorithmica, 12 (4/5), 345-374.

The invention claimed is:

1. A method of searching for a final number of result strings, having a partial or an exact match with a query string, in a database comprised of many long strings or a long string, said method comprising the steps of: partitioning the query string in a first number of input query strings; determining a second number of neighboring strings for each string in said first number of input query strings, wherein each string in said second number of neighboring strings has a predetermined first number of errors; calculating the predetermined first number of errors and comparing it to a threshold; determining whether the predetermined number of errors is equal to or larger than the threshold for determining whether to keep or discard the second number of neighboring strings; searching the database for a third number of exact matches for each string in said second number of neighboring strings, which are not discarded, based on a search method; concatenating said searched exact matched strings from the database into a fourth number of intermediate strings wherein said searched exact matched strings comprised in each of said intermediate strings are in corresponding succession to the partitioned input query strings in said database; and determining the final number of result strings based on said fourth number of intermediate strings, wherein each string in the final number of result strings has a maximum of a predetermined second number of errors compared to said query string.

2. A method according to claim 1 characterized in that said search method is a q-gram index method.

3. A method according to claim 1 characterized in that said search method is a suffix tree method.

4. A method according to claim 1 characterized in that said search method is a hash method.

5. A method according to claim 1 characterized in that said strings and said database each comprises a sequence of alphabet letters.

6. A method according to claim 1 characterized in that said strings and said database each represents an essence of a musical score.

7. A method according to claim 1 characterized in that said strings and said database each comprises a sequence of binary digits.

8. A method according to claim 1 characterized in that said strings and said database each comprises a sequence of amino acids or a sequence of DNA/RNA bases.

9. A method according to claim 1 characterized in that said strings and said database each comprises a sequence of bits, bytes or words.

10. The method according to claim 1 characterized in that the second number of neighboring strings are discarded if the predetermined first number of errors is less than the threshold.

11. A search engine configured for execution by a processor, said search engine comprising calculation means for carrying out the steps of a method of searching for a final number of result strings, having a partial or an exact match with a query string, in a database comprised of many long strings or a long string, said method comprising the steps of: partitioning the query string in a first number of input query strings; determining a second number of neighboring strings for each string in said first number of input query strings, wherein each string in said second number of neighboring strings has a predetermined first number of errors; calculating the predetermined first number of errors and comparing it to a threshold; determining whether the predetermined number of errors is equal to or larger than the threshold for determining whether to keep or discard the second number of neighboring strings; searching the database for a third number of exact matches for each string in said second number of neighboring strings, which are not discarded, based on a search method; concatenating said searched exact matched strings from the database into a fourth number of intermediate strings wherein said searched exact matched strings comprised in each of said intermediate strings are in corresponding succession to the partitioned input query strings in said database; and determining the final number of result strings based on said fourth number of intermediate strings, wherein each string in the final number of result strings has a maximum of a predetermined second number of errors compared to said query string.

12. A tool comprising a processor; and means for carrying out the steps of a method by the processor, the steps comprising searching for a final number of result strings, having a partial or an exact match with a query string, in a database comprised of many long strings or a long string partitioning the query string in a first number of input query strings; determining a second number of neighboring strings for each string in said first number of input query strings, wherein each string in said second number of neighboring strings has a predetermined first number of errors; calculating the predetermined first number of errors and comparing it to a threshold; determining whether the predetermined number of errors is equal to or larger than the threshold for determining whether to keen or discard the second number of neighboring strings; searching the database for a third number of exact matches for each string in said second number of neighboring strings, which are not discarded, based on a search method; concatenating said searched exact matched strings from the database into a fourth number of intermediate strings wherein said searched exact matched strings comprised in each of said intermediate strings are in corresponding succession to the partitioned input query strings in said database; and determining the final number of result strings based on said fourth number of intermediate strings, wherein each string in the final number of result strings has a maximum of a predetermined second number of errors compared to said query string.

13. A processing arrangement comprising: a processor comprising: calculation means for partitioning the query string in a first number of input query strings; calculation means for determining a second number of neighboring strings for each string in said first number of input query strings, wherein each string in said second number of neighboring strings has a predetermined first number of errors; calculation means for determined the predetermined first number of errors; comparison means for comparing the predetermined first number of errors to a threshold; determination means for determining whether the predetermined number of errors is equal to or larger than the threshold and for determining whether to keen or discard the second number of neighboring strings; calculation means for searching the database for a third number of exact matches for each string in said second number of neighboring strings, which are not discarded, based on a search method; calculation means for concatenating said searched exact matched strings from the database into a fourth number of intermediate strings wherein said searched exact matched strings comprised in each of said intermediate strings are in corresponding succession to the partitioned input query strings in said database; and calculation means for determining the final number of result strings based on said fourth number of intermediate strings, wherein each string in the final number of result strings has a maximum of a predetermined second number of errors compared to said query string.

14. A computer system having a processor for performing a method of searching for a final number of result strings, having a partial or an exact match with a query string, in a database comprised of many long strings or a long string, said processor performing the steps of the method which comprise: partitioning the query string in a first number of input query strings; determining a second number of neighboring strings for each string in said first number of input query strings, wherein each string in said second number of neighboring strings has a predetermined first number of errors; calculating the predetermined first number of errors and comparing it to a threshold; determining whether the predetermined number of errors is equal to or larger than the threshold for determining whether to keen or discard the second number of neighboring strings; searching the database for a third number of exact matches for each string in said second number of neighboring strings, which are not discarded, based on a search method; concatenating said searched exact matched strings from the database into a fourth number of intermediate strings wherein said searched exact matched strings comprised in each of said intermediate strings are in corresponding succession to the partitioned input query strings in said database; and determining the final number of result strings based on said fourth number of intermediate strings, wherein each string in the final number of result strings has a maximum of a predetermined second number of errors compared to said query string.

15. A computer program product comprising program code means stored on a computer readable having instructions, that when executed by a processor, result in execution of a method of searching for a final number of result strings, having a partial or an exact match with a query string, in a database comprised of many long strings or a long string, said method comprising the steps of: partitioning the query string in a first number of input query strings; determining a second number of neighboring strings for each string in said first number of input query strings, wherein each string in said second number of neighboring strings has a predetermined first number of errors; calculating the predetermined first number of errors and comparing it to a threshold; determining whether the predetermined number of errors is equal to or larger than the threshold for determining whether to keen or discard the second number of neighboring strings; searching the database for a third number of exact matches for each string in said second number of neighboring strings, which are not discarded, based on a search method; concatenating said searched exact matched strings from the database into a fourth number of intermediate strings wherein said searched exact matched strings comprised in each of said intermediate strings are in corresponding succession to the partitioned input query strings in said database; and determining the final number of result strings based on said fourth number of intermediate strings, wherein each string in the final number of result strings has a maximum of a predetermined second number of errors compared to said query string.

* * * * *